Oct. 29, 1968  H. E. RUEHLEMANN  3,407,925
MICROELECTRONIC CARRIER
Filed March 19, 1965  3 Sheets-Sheet 1
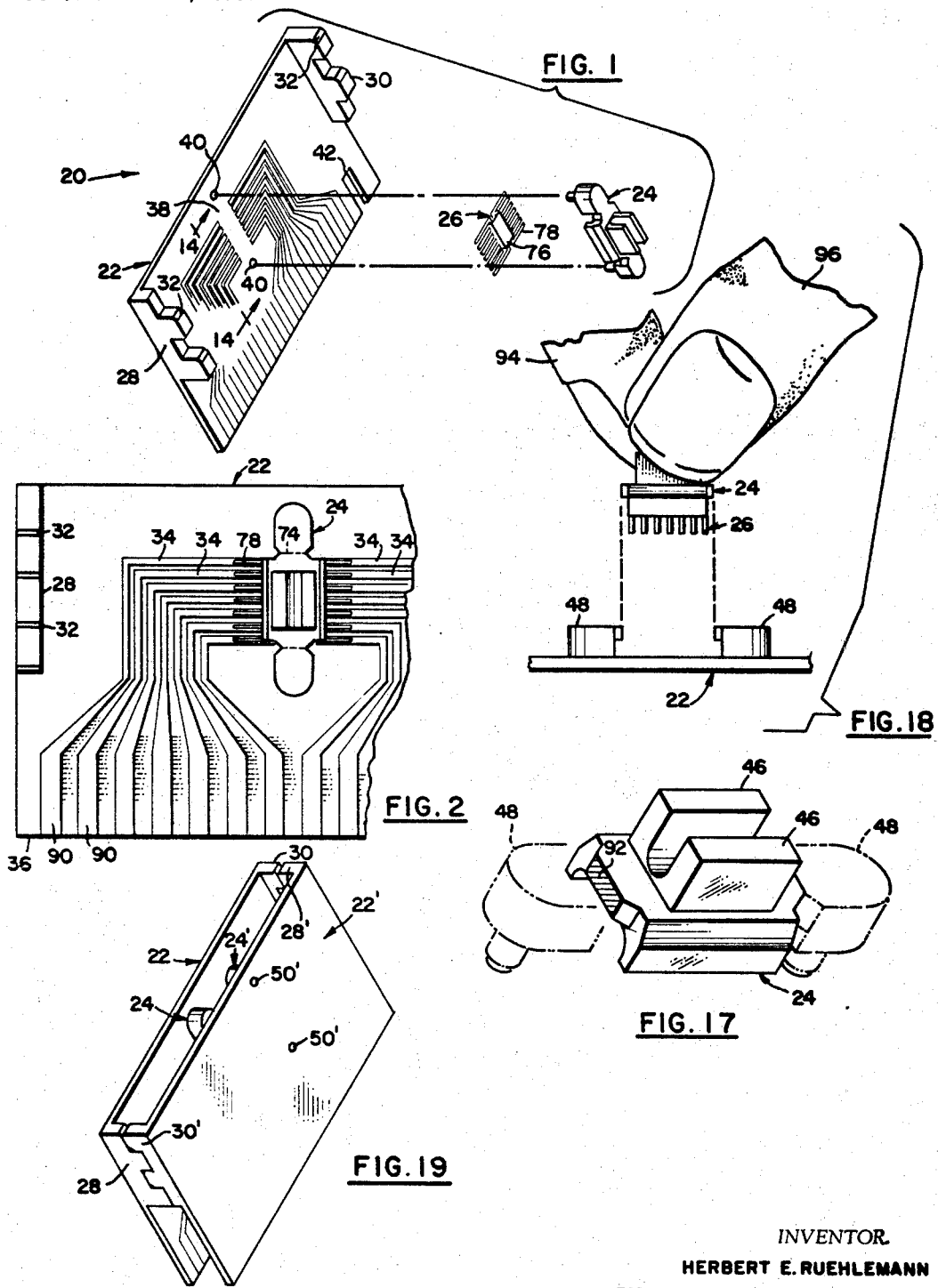
INVENTOR.
HERBERT E. RUEHLEMANN
BY
Caesar, Rivise, Bernstein & Cohen
ATTORNEYS.

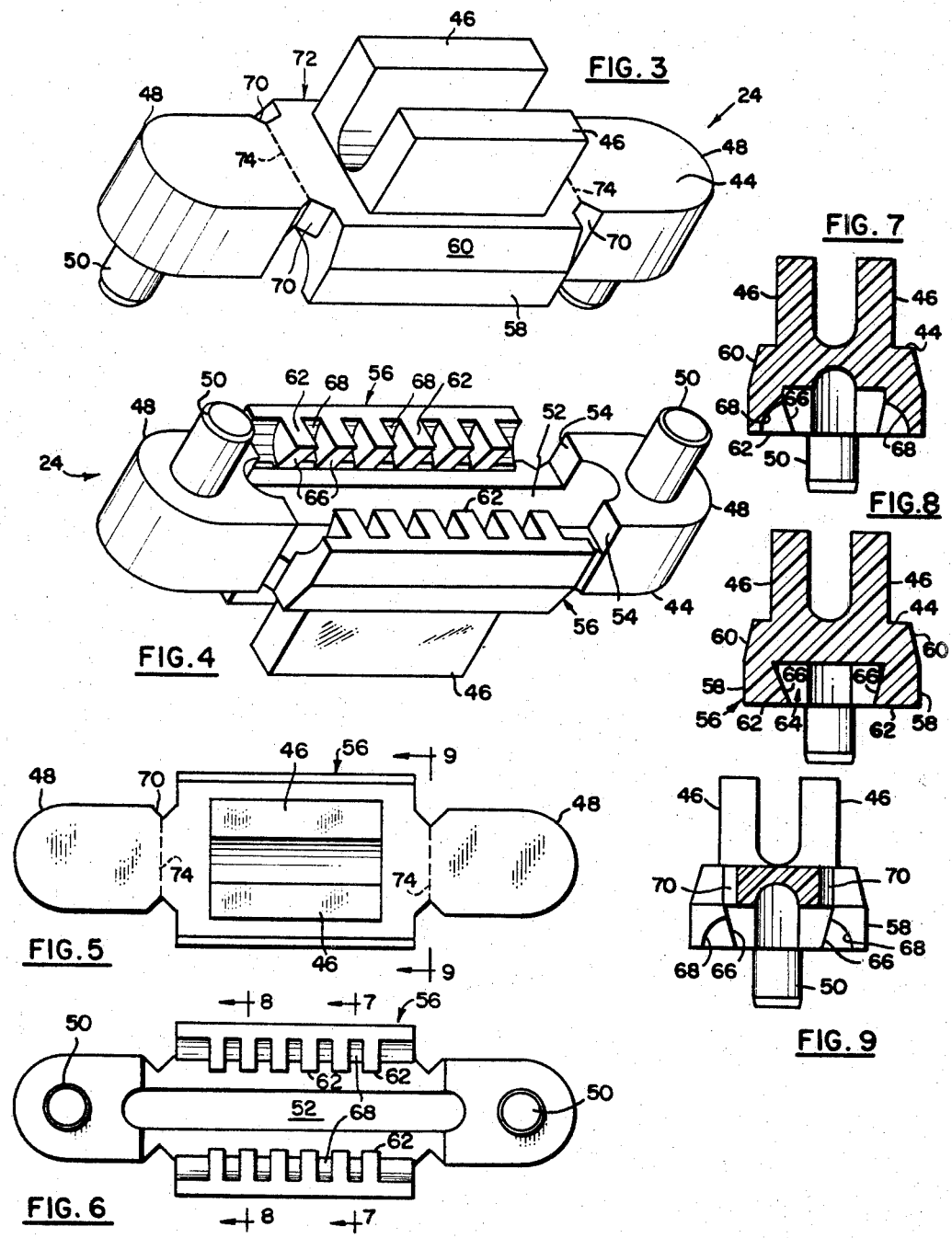

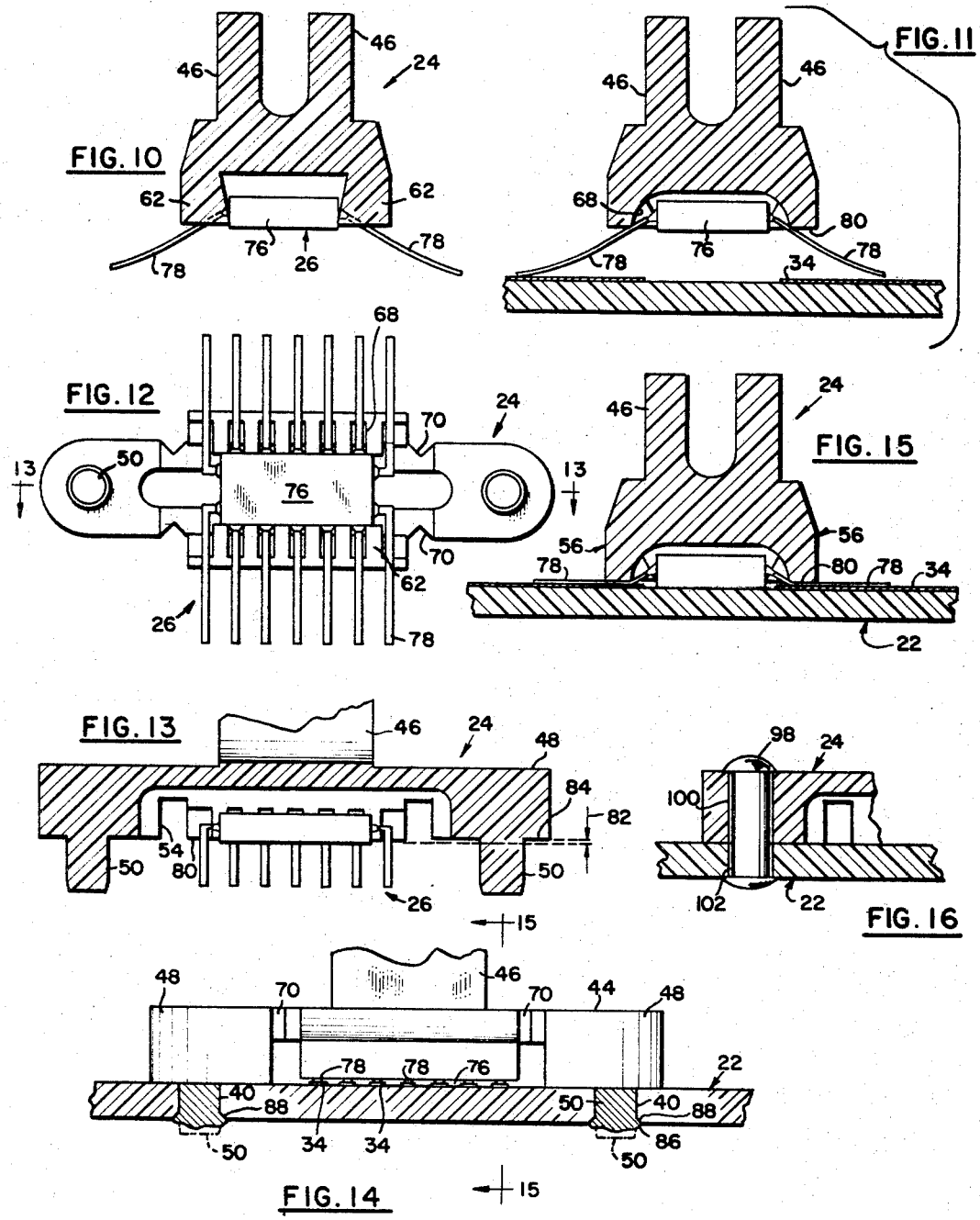

United States Patent Office 3,407,925
Patented Oct. 29, 1968

1

3,407,925
MICROELECTRONIC CARRIER
Herbert E. Ruehlemann, Huntingdon Valley, Pa., assignor to Elco Corporation, Willow Grove, Pa., a corporation of Pennsylvania
Filed Mar. 19, 1965, Ser. No. 441,177
28 Claims. (Cl. 206—65)

ABSTRACT OF THE DISCLOSURE

A carrier for securing a microelectronic circuit to a carrier plate has a holder which grasps the circuit and permits the latter to be attached to a carrier plate by securing the holder to the plate.

This invention relates to a carrier for microelectronic circuits, and more particularly, to a device which is used as a shipping container, testing board, and holder for microelectronic circuits.

Microelectronic circuits, which are also known as integrated circuits, are now widely applied to numerous electronic usages. The common feature that all of these devices possess is that they have reduced large and cumbersome circuits to miniaturization. For a complete discussion of microelectronic circuits, their manufacturers, and a bibliography, attention is called to the Sept. 28, 1964, issue of "Electronic Design" which is entitled "Microelectronics Data Chart."

It is now a common practice to ship microelectronic circuits in specially molded plastic containers. Relatively extensive care must be taken in the handling and shipping of these circuits since the wire leads are exposed and unprotected. Damage to a lead will either render the entire circuit ineffective or will necessitate a costly and time-consuming repair. The general practice is to place the circuits into the plastic containers by means of delicate handling devices such as vacuum tweezers or spring tweezers similar to those in general usage. When the circuit has been received by the ultimate user it must be removed from its container and tested. The testing is accomplished by securing temporary leads of testing circuitry onto the leads of the microelectronic circuit or contacting the circuit leads by hand-held testing leads.

The device of this invention greatly facilitates the handling, shipping and testing of microelectronic circuits. Once the circuit has been placed on the carrier of this invention it can be shipped to the ultimate user and tested by the user while it remains on the carrier. There is no need of providing a separate shipping container.

Another feature of this invention is the provision of a holder which forms part of the carrier and can be used for moving the microelectronic circuit to the carrier and from the carrier when it is to be inserted into its ultimate position in an electronic device. Thus, using the device of this invention the microelectronic circuit will be carried from the manufacturer, through his shipping department, to the customer's receiving and incoming inspection department, and through the functional testing and quality control of the circuit by the customer without undue handling.

It is therefore an object of this invention to provide a microelectronic carrier.

It is another object of this invention to provide a device for shipping, handling, storing and testing of microelectronic circuits.

It is a further object of this invention to provide a device that protects the leads of a microelectronic circuit during the testing thereof.

It is another object of this invention to provide a carrier for a microelectronic device which permits the breadboarding of the device to prove out circuit configurations while permitting re-use of the microelectronic device in the final product.

It is a further object of this invention to provide a carrier for a microelectronic device which will enable the maintaining of positive identity of the device up to the point of assembly into the final product.

It is a further object of this invention to provide a holder for a microelectronic device which can be used during the soldering or welding of the device into the finished product.

It is a further object of this invention to provide a carrier for a microelectronic device which can be rendered unusable after the device has been removed, thereby insuring that the device is being used for the first time by the purchaser.

These and other objects of this invention are accomplished by providing a carrier for a microelectronic circuit comprising a carrier plate and a holder for said microelectronic circuit secured thereto, said holder including means for securing said microelectronic circuit therein, said holder being removable from said plate, with said microelectronic circuit being grasped by said holder upon removal of the holder.

Other objects and many of the attendant advantages of this invention will be readily appreciated as the same becomes better understood by reference to the following detailed description when considered in connection with the accompanying drawings wherein:

FIG. 1 is an exploded perspective view of the carrier plate, microelectronic circuit and holder of this invention;

FIG. 2 is a fragmentary top plan view of the device of this invention with the microelectronic circuit secured in place on the carrier plate;

FIG. 3 is a perspective view of the holder of this invention, taken from the top thereof;

FIG. 4 is a perspective view of the holder of this invention taken from the bottom thereof;

FIG. 5 is a top plan view of the holder of this invention;

FIG. 6 is a bottom plan view of the holder of this invention;

FIG. 7 is a sectional view taken along the line 7—7 of FIG. 6;

FIG. 8 is a sectional view taken along the line 8—8 of FIG. 6;

FIG. 9 is a sectional view taken along the line 9—9 of FIG. 5;

FIG. 10 is a sectional view showing the grasping of a microelectronic circuit by the holder of this invention;

FIG. 11 is an exploded sectional view showing the effect of the holder on the leads of a microelectronic circuit and showing the holder just prior to application to the carrier plate;

FIG. 12 is a bottom plan view of the holder of this invention with the microelectronic circuit in place;

FIG. 13 is a longitudinal sectional view showing the holder of this invention with a microelectronic circuit secured in place, and is taken along the line 13—13 of FIG. 12;

FIG. 14 is a front sectional view of the microelectronic circuit secured against the carrier plate of this invention by the holder;

FIG. 15 is a sectional view taken along the line 15—15 of FIG. 14;

FIG. 16 is a partial sectional view showing an alternative method of securing the holder to the carrier plate of this invention;

FIG. 17 is a perspective view, partially in phantom, showing the holder of this invention after it has been cut from the carrier plate;

FIG. 18 is a front elevational exploded view showing the holder of this invention grasping a microelectronic circuit as it is being removed from the carrier plate; and FIG. 19 is a perspective view showing the nesting of two of the devices of this invention for shipment and storage.

Referring now in greater detail to the various figures of the drawings wherein similar reference characters refer to similar parts, a microelectronic carrier embodying the present invention is generally shown at 20 in FIG. 1. Device 20 basically comprises a carrier plate 22 and a microelectronic circuit holder 24. As will be explained more fully hereinafter, plate 22 and holder 24 cooperate in forming a package for the shipment, handling, storing, and testing of a microelectronic circuit 26.

Carrier plate 22 is basically rectangular in shape and includes a pair of upstanding nesting members 28 and 30, with one nesting member being at one lateral edge of the plate and the other being at the opposite lateral edge of the plate. Each nesting member is F-shaped and includes bevelled edges 32 on the projections of the F. As seen in FIG. 1, nesting member 28 comprises an inverted F whereas nesting member 30 comprises an upright F. The purpose of this formation will be explained hereinafter.

Carrier plate 22 is provided with a plurality of spaced printed electrical leads 34. In the embodiment shown, seven equally spaced parallel printed leads are provided. However, this number can be varied depending on the number of leads on the microelectronic circuit. Printed electric leads 34 terminate in a spaced parallel arrangement at the lower edge 36 of carrier plate 22. As seen in FIG. 1, the printed leads are spaced by a gap 38. A pair of aligned holes 40 are formed in carrier plate 22 and bridge gap 38. An upwardly extending slot 42 is cut in the lower edge of plate 22. As seen in FIG. 1, the printed electrical leads and holes 40 are offset to one side relative to the longitudinal center of carrier plate 22. Thus there are no leads present on the side where slot 42 has been formed.

As best seen in FIGS. 3 and 4, holder 24 basically comprises an elongated bar 44 and a pair of spaced gripping tabs 46 on the top thereof. Gripping tabs 46 are molded integrally with bar 44 as seen in FIGS. 7 and 8. Bar 44 includes ends 48 which are rounded for ornamental purposes. A pair of pins 50 project from the undersurfaces of ends 48. Pins 50 are preferably integrally molded with the bar 44. A central recess 52 is formed in the undersurface of bar 44 and extends longitudinally from one end 48 to the other. As seen in FIG. 4, ends 48 terminate in vertical walls 54 on the underside of bar 44.

Bar 44 also includes a pair of opposed rows of gripping fingers generally designated at 56. The outer walls of the gripping finger rows are impervious and include vertical sections 58 and inclined sections 60 which terminate at the top surface of bar 44. As seen in FIGS. 5 and 6, the rows of gripping fingers 56 extend laterally outwardly to a greater extent than the side walls of ends 48.

Each row of gripping fingers 56 includes a plurality of spaced fingers 62. As best seen in FIG. 8, each finger 62 projects into a cavity 64 formed in the undersurface of bar 44. Each finger 62 includes an inclined face 66 within the cavity. As seen in FIG. 8, inclined faces 66 project outwardly from the center of bar 44 in going from the bottom to the top of the finger. Fingers 62 are spaced by recesses 68 having concave rear walls (FIG. 7).

V-shaped cuts 70 partially space ends 48 from the central portion 72 of rod 44. As will be explained hereinafter, central portion 72 can be separated from ends 48 by cutting from one V-shaped cut to the opposite V-shaped cut along the line indicated at 74.

Holder 24 is used for grasping a microelectronic circuit 26. As seen in FIG. 1, a microelectronic circuit basically comprises a body portion 76 and a plurality of parallel equally spaced leads 78 projecting from each side of the body portion. In use, a microelectronic circuit is grasped by holder 24 by first depressing gripping tabs 46 between the thumb and forefinger. As viewed in FIG. 8, this depression will cause fingers 62 to spread or open outwardly. This is because holder 24 is integrally molded from a resilient material and the inward movement of tabs 46 causes a resultant outward movement of the two rows 56 of gripping fingers. Once the fingers 62 have been spread, a microelectronic circuit 26 is placed between them. Thereafter, as seen in FIG. 10, the pressure on tabs 46 is removed and body portion 76 of the microelectronic circuit is securely grasped by the fingers 62. As seen in FIG. 11, the leads 78 are received in recesses 68. Since the body portion 76 is grasped near the bottom thereof, the lower wall 80 of rod 44 forces leads 78 downwardly. This is because the leads project outwardly from the center of body portion 76.

In FIG. 12, a microelectronic circuit 26 is shown in position within holder 24. It is thus seen that body portion 76 is securely grasped by fingers 62 and the leads 78 are received within recesses 68. By way of non-limiting example, fingers 62 and recesses 68 are of the same width. Both the fingers and the recesses are on centers of 0.050 inch. This spacing is preferred because the normal spacing for the leads of a microelectronic circuit is also 0.050 inch centers. In order to permit ease of insertion of the leads into the recesses 68, the recesses are approximately twice the width of the leads 78. This permits the rapid insertion of the microelectronic circuit without any unnecessary delay caused by attempting to fit the circuit in place.

The sectional view of FIG. 13 shows the condition of circuit 26 in holder 24 immediately prior to the securement of the holder on carrier plate 22. As shown by arrow 82 in FIG. 13, the lower edges 84 of ends 48 are raised slightly higher than the lower edges 80 of rows 56. This difference in height is extremely small and can be on the order of 0.005 inch. With the microelectronic circuit in place, the holder is then secured to carrier plate 22 by placing pins 50 in holes 40 (FIG. 1). The lower edges of undersections 48 are forced downwardly against the top of carrier plate 22. These ends are secured in place by bringing a heated metallic element into contact with the ends of the pins 50 which project through the bottoms of holes 40. This flattens the ends of pins 50 as shown at 86 in FIG. 14. The prior condition of the ends of the pins is shown at 50' in FIG. 14. Carrier plate 22 is countersunk at the base of holes 40, as shown at 88. The purpose of the countersinking is to receive the plastic of pin 50 which flows under the influence of the heat from the heated metal. Thus, holder 24 is heat staked to carrier plate 22.

As pointed out above, the bottom surface of ends 48 was elevated above the bottom surface of rows 56. Thus when the ends 48 are heat staked in place and abut carrier plate 42, a positive pressure is applied against the bottom surface 80 of rows 56. As previously pointed out, holder 24 is made of a resilient material and thus this deformation caused by forcing ends 48 downwardly is easily accomplished. As seen in FIG. 15, having a positive force applied against lower surface 80 results in the application of a positive force against leads 78 of the microelectronic circuit. Thus as seen in FIG. 2, these leads will be forced into positive engagement with spaced printed circuit lines 34. While in this condition, it is a relatively simple matter to test each lead of the microelectronic circuit by making electrical connection with the edges 90 of the printed circuit lines 34. As seen in FIG. 2, the printed circuit lines 34 are expanded in width at their edges 90 in order to facilitate the clipping on or securing of testing leads.

After the circuit 26 has been secured in place on carrier 22 by holder 24, a completed shipping assembly is prepared by nesting a second board and associated circuit and holder onto the first board. Thus, in FIG. 19 the package of carrier plate 22 and holder 24 are shown on the left and a second carrier plate 22' and holder 24' are shown on the right. In making the assembly a device identical to that shown in FIG. 2 is placed face down against the base device. The two devices are locked in place by the engagement of nesting members 28 and 30. Bevelled edges 32 facilitate the nesting operation. When nested, member 30' of the top carrier plate will be received in member 28 of the bottom carrier plate and member 28' of the top carrier plate will be received in member 30 of the bottom carrier plate. The purpose of having the printed leads offset with respect to the center of the carrier plate is to permit the staking of two carrier plates in a relatively narrow area. Thus, as seen in FIG. 19, holder 24 will bypass holder 24' when the two plates are staked. If the eccentric printed leads were not present it would be necessary to space the two plates a distance equal to the height of the combined holders 24 and 24'. With the holders bypassing each other, the total height is only that of a single holder.

With the devices in the condition shown in FIG. 19 they are then shipped from the manufacturer of the microelectronic circuit to the user. When received by the user the two nested devices are separated and the circuits can be tested by securing external leads to the edges 90 of the printed electrical leads. Since the leads of the microelectronic circuit are physically and electrically in contact with the printed circuit leads, testing of the microelectronic circuit is easily accomplished through the printed circuit leads. Slot 42 in carrier board 22 is a polarization slot used for testing. With the device in the condition shown in FIG. 2, it can be also used in breadboarding, that is, the making of a composite assembly utilizing a plurality of microelectronic circuits for the purpose of testing.

After the microelectronic circuit has been completely tested, it is removed from the carrier plate 22 by cutting holder 24 along lines 74 (FIG. 3). This cutting leaves edges 92 (FIG. 17) and also leaves end portions 48 secured to the carrier plate 22, as shown in FIG. 18. As further shown in FIG. 18, when the holder 24 is removed it will still be retaining microelectronic circuit 26. Thus the holder can be used for transporting the circuit to the ultimate product and putting it in the desired location. When the circuit 26 has been put in place within the final product, the leads are then secured in place by soldering or welding. Thereafter, holder 24 is removed by grasping tabs 46 between the forefinger 94 and thumb 96 and squeezing the tabs toward each other. This will release the pressure of the fingers 62 against the body 76 of the microelectronic circuit, thereby freeing the circuit from the grasp of the holder 24. Thereafter, the holder can be used for picking up and moving other microelectronic circuits which were not previously mounted on the carrier plate of this invention. One advantage of the holder itself over other devices for moving microelectronic circuits is that the leads are partially protected by the holder and are maintained in their given spaced orientation by recesses 68.

In FIG. 16 an alternate method of securing holder 24 to carrier plate 22 is shown. Thus a separate rivet 98 may be passed through aligned holes 100 and 102 in the holder and carrier, respectively. The rivet would serve the same function as the heat-staking pins 50.

Another alternative to the heat-staked pin would be to provide a pair of pins similar to pins 50 on carrier plate 22. These pins would project upwardly and would be received in holes in sections 48 of bar 44. They would then be heat staked in place against the tops of end sections 48. The advantage of this structure over that shown is that the bottom of bar 44 would be substantially flat, thereby enabling the user to pick up a microelectronic circuit which is lying flat on a table without the use of any auxiliary pick-up means. Having the pins 50 on the carrier 24 renders this step more difficult as it would be necessary to have the microelectronic circuit on a narrow strip in order to enable it to be picked up by the holder shown. However, functionally, the holder and carrier plate combination are substantially identical regardless of the location of the pins 50.

The carrier plate 22 can be made of any rigid material generally used as a printed circuit board. Thus it can be cardboard, a molded mixture of an epoxy resin and fiber glass or any of the thermosetting resins, such as polysulfone or phenolic resins. The printed electrical leads can be placed on the carrier plate 22 by any of the methods known to the art of making printed circuits. Thus, the leads can be printed on a separate board which is then laminated to the carrier plate. Alternatively, the leads can be placed on a pressure-sensitive adhesive tape which is in turn adhesively laminated to the carrier plate. A third method is to print the electrical leads directly onto the carrier plate.

The holder 24 is made of a resilient plastic material. In the case where pins 50 are used, this material is a thermoplastic resin which can be heat staked to the carrier plate. Examples of resins which are thermoplastic and also possess the desired resiliency are polyethylene, polypropylene and nylon.

The microelectronic circuit, which is also known in the art as an integrated circuit, can be of any configuration known in the art. The number of leads coming from the body can be widely varied while still being adapted to the teachings of the device of this invention. The one element that substantially all microelectronic circuits have in common is that the leads are spaced on the 0.050 inch centers. However, in the event that these centers are varied, the holder of this invention and the associated printed electric leads can also be varied accordingly to accommodate the microelectronic circuit.

The specific circuitry of the microelectronic circuit forms no part of this invention. The device of this invention is adapted for any microelectronic circuit which includes a body and leads. Numerous examples of circuits adapted to miniaturization in microelectronic circuits can be found in the aforementioned Sept. 28, 1964, issue of "Electronic Design."

Another feature of the device of this invention is that the carrier plates can easily be marked for identification and the storage of the microelectronic circuits. Thus, various indicia can be etched into the surface of the carrier plate for subsequent identification. Alternatively, labels can be secured to the carrier plate.

Since the holder 24 is removed from the carrier plate by severing along line 74, the purchaser of the device will be assured that the circuit has not been previously removed from the device. Thus, the purchaser can tell whether the microelectronic circuit has been sealed by the factory by merely observing the completed device. Once the holder has been cut from the carrier plate it can no longer be secured back in place without said securement being readily apparent. This gives the purchaser of the device the added assurance that there has been no tampering with it since it left the manufacturer. Since the materials used in manufacturing the device of this invention are of a relatively low cost, it is economically feasible for the manufacturer to give this assurance to the purchaser through the use of dispensible devices.

As seen in FIG. 2, the leads 78 are approximately one-half the width of printed electric leads 34. Thus leads 34 are of the same width as recesses 68 and are aligned therewith when the pins 50 are inserted in holes 40. Therefore, regardless of the location of the microelectronic circuit leads in recesses 68, electrical connection between the leads and the printed lines is assured.

In some instances, it may be desirable to actually secure wires to carrier plate 22 instead of using printed circuit leads. These wires would then be secured in the same spaced relationship as leads 34 and the opposite ends of the wires would be left exposed for testing.

Using the device of this invention, it will be unnecessary for the purchaser of the microelectronic circuit ever to touch the leads of the circuit prior to inserting the circuit into the final product. Since there is little or no handling of the leads, the danger of breakage of the leads is substantially eliminated. If a lead were broken and its hermetic seal were also broken the entire microelectronic circuit would be rendered useless. Using the prior art tweezers and the involved testing steps, breakage of the leads was an ever-present problem.

Obviously many modifications and variations of the present invention are possible in the light of the above teachings. It is, therefore, to be understood that within the scope of the appended claims, the invention may be practiced otherwise than as specifically described.

What is claimed as the invention is:

1. A carrier for a microelectronic circuit comprising:
   (a) a carrier plate and a holder for said microelectronic circuit secured to said plate;
   (b) said holder including means for securing said microelectronic circuit therein;
   (c) said holder being removable from said plate, with said microelectronic circuit being grasped by said holder upon removal of said holder;
   (d) said carrier further including upwardly extending nesting members on the surface of said carrier plate.

2. A carrier for a microelectronic circuit comprising:
   (a) a carrier plate and a holder for said microelectronic circuit secured to said plate;
   (b) said holder including means for securing said microelectronic circuit therein;
   (c) said holder being removable from said plate, with said microelectronic circuit being grasped by said holder upon removal of said holder;
   (d) said holder being secured to said carrier plate by heat-staked pins.

3. A carrier for a microelectronic circuit comprising:
   (a) a carrier plate and a holder for said microelectronic circuit secured to said plate;
   (b) said holder including means for securing said microelectronic circuit therein;
   (c) said holder being removable from said plate, with said microelectronic circuit being grasped by said holder upon removal of said holder;
   (d) said holder being secured to said carrier by rivets.

4. A carrier for a microelectronic circuit comprising:
   (a) a carrier plate and a holder for said microelectronic circuit secured to said plate;
   (b) said holder including means for securing said microelectronic circuit therein;
   (c) said holder being removable from said plate, with said microelectronic circuit being grasped by said holder upon removal of said holder;
   (d) said holder comprising a resilient material and including openable gripping means for securing said microelectronic circuit;
   (e) said holder including a bar and said openable gripping means comprising a pair of spaced opposed rows of gripping fingers projecting inwardly toward each other from the bottom of said bar.

5. The carrier of claim 4 wherein each of said gripping fingers includes an inner surface which is inclined outwardly in rising from the bottom to the top thereof.

6. The carrier of claim 4 wherein said gripping fingers are equally spaced and include recesses therebetween, said bar having dependent vertical walls, said recesses being formed on the interior surfaces of said walls but not projecting therethrough, said fingers projecting inwardly from said vertical walls, whereby the leads of said microelectronic circuit will be received in said recesses and held against said plate by the lower edges of said vertical walls.

7. A carrier for a microelectronic circuit comprising:
   (a) a carrier plate and a holder for said microelectronic circuit secured to said plate;
   (b) said holder including means for securing said microelectronic circuit therein;
   (c) said holder being removable from said plate, with said microelectronic circuit being grasped by said holder upon removal of said holder;
   (d) said holder comprising a resilient material and including openable gripping means for securing said microelectronic circuit;
   (e) said holder comprising a bar, with said gripping means being positioned on the lower surface of said bar;
   (f) means positioned on the upper surface of said bar for spreading said gripping means, and comprising a pair of spaced depressible tabs which project upwardly from the top surface of said bar.

8. A carrier for a microelectronic circuit comprising:
   (a) a carrier plate and a holder for said microelectronic circuit secured to said plate;
   (b) said holder including means for securing said microelectronic circuit therein;
   (c) said holder being removable from said plate, with said microelectronic circuit being grasped by said holder upon removal of said holder;
   (d) said holder comprising a resilient material and including openable gripping means for securing said microelectronic circuit;
   (e) said holder comprising a bar and said openable gripping means being located in the central portion of said bar;
   (f) said bar additionally including end portions which are secured to said carrier plate, said end portions being partially separated from said central portion by slots formed in said bar whereby said central portion can be separated from said end portions by cutting the bar across said slots.

9. A package for the shipment, storage and testing of microelectronic circuits comprising a pair of carrier plates, each of said carrier plates having electrical contacts on the surface thereof, a microelectronic circuit secured to each of said carrier plates, each of said microelectronic circuits having a body portion and leads, said leads being in contact with said electrical contacts, and nesting means on each of said carrier plates, said carrier plates being mounted together by said nesting means.

10. The package of claim 9 wherein said electrical contacts comprise printed electrical leads.

11. The package of claim 10 wherein said printed electrical leads are in a pattern which is laterally offset relative to the longitudinal center of their associated carrier plate whereby means holding said microelectronic circuits on their respective carrier plates will bypass each other when the plates are nested.

12. A carrier plate for transporting, storing and testing microelectronic circuits comprising a rigid plate having spaced electrical contacts thereon, said contacts being adapted to physically contact the leads of a microelectronic circuit, and nesting members projecting from the surface of said plate.

13. The carrier plate of claim 12 wherein said electrical contacts comprise a plurality of spaced printed electrical leads, said printed leads being adapted to contact said microelectronic circuit at an intermediate position on said plate, and said printed leads extending to an edge on said plate.

14. The carrier of claim 13 wherein said printed leads have a greater width at the edge of said plate than at said intermediate position on said plate.

15. The carrier of claim 12 wherein said printed electrical leads form a pattern which is laterally offset relative to the longitudinal center of said plate.

16. The carrier of claim 12 and further including a slot formed in said plate, said slot serving as a polarization slot for the testing of said microelectronic circuit when it is held on said plate.

17. The carrier of claim 13 wherein said printed electrical leads comprise a pair of groups of spaced leads, said pair of groups having a gap between them wherein no leads are present, said microelectronic circuit adapted to be placed on said plate at said gap.

18. A holder for a microelectronic circuit comprising a resilient material and including a bar, gripping means for securing said microelectronic circuit associated with said bar, and means associated with said bar for opening said gripping means.

19. The holder of claim 18 wherein said gripping means comprise a pair of spaced opposed rows of spaced gripping fingers projecting inwardly toward each other from the bottom of said bar.

20. The holder of claim 19 wherein each of said gripping fingers includes an inner surface which is inclined outwardly in rising from the bottom to the top thereof.

21. The carrier of claim 19 wherein said gripping fingers are equally spaced and include recesses therebetween, said bar having dependent vertical walls, said recesses being formed on the interior surfaces of said walls, but not projecting therethrough, said fingers projecting inwardly from said vertical walls, whereby the leads of said microelectronic circuit will be received in said recesses.

22. The holder of claim 18 wherein said opening means comprises a pair of spaced depressible tabs which project upwardly from the top surface of said bar.

23. The holder of claim 18 wherein said gripping means are located in the central portion of said bar, said bar additionally including end portions projecting outwardly from said central portion and longitudinally aligned therewith, said end portions adapted to be severed from said central portion.

24. The holder of claim 23 wherein said end portions are partially separated from said central portion by slots formed in said bar, whereby said central portion can be severed from said end portions by cutting the bar across said slots.

25. The holder of claim 23 wherein said end portions have means associated therewith for securing said bar to a carrier plate.

26. The holder of claim 25 wherein said securing means comprise a pin depending from each of said end portions, said pins comprising a thermoplastic material.

27. The holder of claim 18 wherein the bar, gripping means and opening means are unitary and are molded from a thermoplastic resin.

28. The holder of claim 27 wherein said thermoplastic resin comprises polyethylene.

References Cited

UNITED STATES PATENTS

| | | | |
|---|---|---|---|
| 2,757,792 | 8/1956 | Shioleno | 206—80 X |
| 3,069,751 | 12/1962 | Deakin | 206—65 |
| 3,140,773 | 7/1964 | Cheh | 206—80 X |
| 3,176,838 | 4/1965 | Duval | 206—65 |
| 3,252,568 | 5/1966 | Steidinger | 220—4 |
| 3,278,018 | 10/1966 | Ishler | 206—80 X |

OTHER REFERENCES

German printed application 1,085,810, July 1960.

JAMES B. MARBERT, *Primary Examiner.*